US010514680B2

(12) United States Patent
Madelone, Jr. et al.

(10) Patent No.: US 10,514,680 B2
(45) Date of Patent: Dec. 24, 2019

(54) SYSTEM AND METHOD FOR CONTROLLING AN ADDITIVE MANUFACTURING SYSTEM

(71) Applicant: General Electric Company, Schenectady, NY (US)

(72) Inventors: John Joseph Madelone, Jr., South Glens Falls, NY (US); Thomas Charles Adcock, Glenville, NY (US); Justin John Gambone, Jr., Watervliet, NY (US); Michael Evans Graham, Slingerlands, NY (US); Subhrajit Roychowdhury, Niskayuna, NY (US); Daniel J. Erno, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 15/665,086

(22) Filed: Jul. 31, 2017

(65) Prior Publication Data
US 2019/0033828 A1 Jan. 31, 2019

(51) Int. Cl.
G05B 19/4099 (2006.01)
B23K 26/342 (2014.01)
(Continued)

(52) U.S. Cl.
CPC ........ *G05B 19/4099* (2013.01); *B23K 26/082* (2015.10); *B23K 26/342* (2015.10);
(Continued)

(58) Field of Classification Search
CPC ...... G05B 19/4099; G05B 2219/49023; B33Y 10/00; B33Y 30/00; B33Y 50/02;
(Continued)

(56) References Cited

U.S. PATENT DOCUMENTS 6,271,856 B1 * 8/2001 Krishnannurthy ...... G06T 17/30
345/581
2007/0091094 A1 * 4/2007 Hong ..................... G05B 19/41
345/474
(Continued)

FOREIGN PATENT DOCUMENTS

CN 105666867 A 6/2016
WO 2016026820 A1 2/2016
(Continued)

OTHER PUBLICATIONS

"Draft 0.48 Designation: FXXXX-10 Standard Specification for Additive Manufacturing File Format (AMF)", Catalog.
(Continued)

*Primary Examiner* — Rocio Del Mar Perez-Velez
*Assistant Examiner* — Alicia M. Choi
(74) *Attorney, Agent, or Firm* — Armstrong Teasdale LLP

(57) ABSTRACT

A method of manufacturing a component using an additive manufacturing system is provided. The method includes providing a build file on a controller of the additive manufacturing system. The build file includes at least one generating function, at least one seed value, and at least one function parameter. The method also includes generating a curve that corresponds to the component based on the at least one generating function, the at least one seed value, and the at least one function parameter. The method further includes positioning a material on a surface. The method further includes determining, using the controller, a plurality of set points for a consolidation device. The plurality of set points are located along the curve. The method also includes operating the consolidation device of the additive manufacturing system to consolidate the material.

20 Claims, 5 Drawing Sheets

(51) Int. Cl.
*B23K 26/082* (2014.01)
*B33Y 50/02* (2015.01)
*B33Y 30/00* (2015.01)
*B33Y 10/00* (2015.01)

(52) U.S. Cl.
CPC ............... *B33Y 30/00* (2014.12); *B33Y 50/02* (2014.12); *B33Y 10/00* (2014.12); *G05B 2219/49023* (2013.01)

(58) Field of Classification Search
CPC .... B23K 26/082; B23K 26/342; G06T 17/30; B29C 67/0088
USPC .......................................................... 700/119
See application file for complete search history.

(56) References Cited

U.S. PATENT DOCUMENTS

| | | | |
|---|---|---|---|
| 2008/0117205 A1* | 5/2008 | Storti | G06T 17/00 345/420 |
| 2012/0299917 A1* | 11/2012 | Kumar | G06F 17/5009 345/420 |
| 2013/0009338 A1 | 1/2013 | Mayer | |
| 2014/0058959 A1 | 2/2014 | Isbjornssund et al. | |
| 2014/0324204 A1 | 10/2014 | Vidimce et al. | |
| 2015/0134955 A1* | 5/2015 | Lacaze | H04L 9/3247 713/168 |
| 2015/0174828 A1 | 6/2015 | Creuzer et al. | |
| 2016/0179064 A1 | 6/2016 | Arthur et al. | |
| 2017/0066196 A1 | 3/2017 | Beard et al. | |
| 2017/0066198 A1 | 3/2017 | Ur | |
| 2017/0279783 A1* | 9/2017 | Milazzo | H04L 63/061 |
| 2018/0276316 A1* | 9/2018 | Brochu | G06T 17/00 |
| 2018/0281107 A1* | 10/2018 | Durr | B23K 26/0821 |

FOREIGN PATENT DOCUMENTS

| | | |
|---|---|---|
| WO | 2016122660 A1 | 8/2016 |
| WO | 2017/127887 A1 | 8/2017 |

OTHER PUBLICATIONS

Kai Zengz, "Optimization of support structures for selective laser melting", Thesis, Aug. 2015, 1-201, University of Louisville.

Huaishu Peng et al., "On-The-Fly Print: Incremental Printing While Modeling", Journal, 2016, Cornell University.

Galvez, A., et al., "Iterative two-step genetic-algorithm-based method for efficient polynomial B-spline surface reconstruction," Information Sciences, vol. 182, No. 1, pp. 56-76 (2012).

Marussig, B., and Hughes, T. Jr., "A Review of Trimming in Isogeometric Analysis: Challenges, Data Exchange and Simulation Aspects", Archives of Computational Methods in Engineering, vol. 25, pp. 1059-1127 (Jun. 2, 2017).

Vaidya, R., and Anand S., "Image Processing Assisted Tools for Pre- and Post-processing Operations in Additive Manufacturing," Procedia Manufacturing, vol. 5, pp. 958-973 (2016).

Copy of Extended European Search Report and Opinion issued in connection with corresponding EP Application No. 18184874.8 dated Jan. 22, 2019.

* cited by examiner

SYSTEM AND METHOD FOR CONTROLLING AN ADDITIVE MANUFACTURING SYSTEM

BACKGROUND

The field of the disclosure relates generally to additive manufacturing systems and, more specifically, to systems and methods for manufacturing a three-dimensional component using a build file including at least one function.

Additive manufacturing systems and processes are used to fabricate three-dimensional components. For example, in some additive manufacturing processes, successive layers of material are solidified one on top of the other to fabricate the components. At least some known additive manufacturing systems use a laser (or similar energy sources) and a series of lenses and mirrors to direct the laser over a powdered material. Some known additive manufacturing systems include Direct Metal Laser Melting (DMLM), Selective Laser Sintering (SLS), Direct Metal Laser Sintering (DMLS), Selective Laser Melting (SLM) and LaserCusing systems.

Some known additive manufacturing systems include a controller that receives electronic files and directs the laser using the electronic files. In some known additive manufacturing systems, the electronic files include coordinate data that describe a series of linear sections, e.g., vectors, to approximate portions of the three-dimensional components. However, complex three-dimensional components require a plurality of linear sections to approximate portions of the components. As the file size is increased to accommodate the plurality of linear sections, the time required for the controller to receive and process the electronic files is increased. As a result, the cost to produce three-dimensional components is increased. In addition, the electronic files limit the precision with which the additive manufacturing system is able to produce the three-dimensional components.

BRIEF DESCRIPTION

In one aspect, a method of manufacturing a component using an additive manufacturing system is provided. The method includes providing a build file on a controller of the additive manufacturing system. The build file includes at least one generating function, at least one seed value, and at least one function parameter. The method also includes generating a curve that corresponds to the component based on the at least one generating function, the at least one seed value, and the at least one function parameter. The method further includes positioning a material on a surface. The method further includes determining, using the controller, a plurality of set points for a consolidation device. The plurality of set points are located along the curve. The method also includes operating the consolidation device of the additive manufacturing system to consolidate the material.

In another aspect, an additive manufacturing system for manufacturing a component using a build file is provided. The additive manufacturing system includes a controller configured to receive the build file. The build file includes at least one generating function, at least one seed value, and at least one function parameter. The additive manufacturing system also includes a positioning device configured to position a material on a surface. The additive manufacturing system further includes a consolidation device coupled to the controller and positionable relative to the surface. The consolidation device is configured to consolidate the material. The controller is configured to determine a plurality of set points for the consolidation device along the curve defined by the at least one generating function, the at least one seed value, and the at least one function parameter.

DRAWINGS

These and other features, aspects, and advantages of the present disclosure will become better understood when the following detailed description is read with reference to the accompanying drawings in which like characters represent like parts throughout the drawings, wherein.

Figure 1:
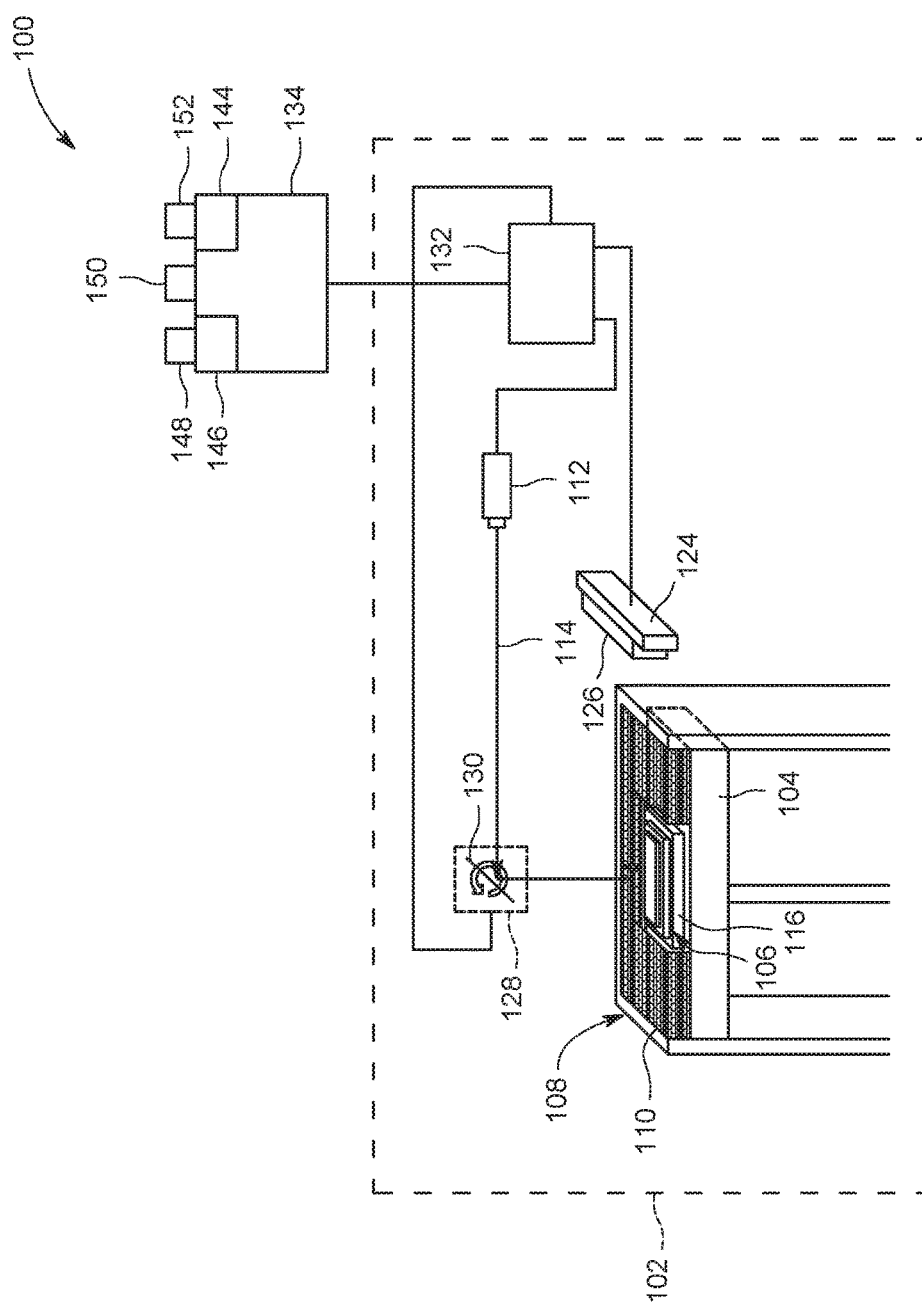
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "function" refers to an expression or equation including one or more variables.

Also, as used herein, the term "build file" refers to an electronic representation of a component for use in fabricating the component.

Embodiments of the present disclosure provide systems and methods for fabricating a component using an additive manufacturing process. The component is fabricated using a build file including a function. A curve is generated using the function, at least one function parameter, and at least one seed value. In some embodiments, the curve includes at least one non-linear portion. Accordingly, the build file reduces the time to transfer and process data in comparison to at least some known systems. In addition, the build file allows the additive manufacturing system to fabricate components with increased precision and less errors because the controller directs a consolidation device along a curve generated using the function, at least one function parameter, and at least one seed value.

FIG. 1 is a schematic view of an exemplary additive manufacturing system 100. In the exemplary embodiment, additive manufacturing system 100 is a direct metal laser melting (DMLM) system. Although the embodiments herein are described with reference to DMLM systems, this disclosure may also apply to other types of additive manufacturing systems, such as liquid-resin based additive manufacturing systems (e.g., stereolithograpy systems) or selective laser melting systems.

In the exemplary embodiment, additive manufacturing system 100 includes an additive manufacturing device 102. Additive manufacturing device 102 includes a build platform 104 for supporting a three-dimensional component 106 during the additive manufacturing process, a powder bed 108 including particulate build material 110, and an energy source 112. Energy source 112 emits an energy beam 114 for sintering, curing, hardening, or otherwise solidifying or consolidating a portion of powder bed 108 to form three-dimensional component 106 from a plurality of superposed build layers 116. Portions of powder bed 108 are omitted in FIG. 1 for clarity. Additive manufacturing system 100 is used to fabricate any three-dimensional component. In the exemplary embodiment, three-dimensional component 106 is an aircraft component.

Also, in the exemplary embodiment, energy source 112 is a laser device. For example, in some embodiments, energy source 112 is a fiber laser device or a diode laser device. In alternative embodiments, additive manufacturing system 100 includes any energy source 112 that enables additive manufacturing system 100 to operate as described herein. For example, in some embodiments, additive manufacturing system 100 includes, without limitation, an ultraviolet laser, a gas laser, such as a carbon dioxide ($CO_2$) laser, a light source, and an electron beam generator. In further embodiments, additive manufacturing system 100 includes two or more energy sources 112 that have similar power or different power.

Moreover, in the exemplary embodiment, particulate build material 110 is a metallic powder. More specifically, particulate build material 110 is a gas atomized metal powder (e.g., cobalt, iron, aluminum, titanium, and/or nickel alloys) having a mean particle size within a range of between approximately 10 and 100 microns. In alternative embodiments, powder bed 108 includes any particulate build material 110 that enables additive manufacturing system 100 to operate as described herein.

In addition, in the exemplary embodiment, additive manufacturing system 100 includes a build material dispenser and distribution device, also known as a coating or positioning device 124, an imaging device 126, and a consolidation device 128. Coating device 124 is configured to provide a thin layer of particulate build material 110 over a surface such as a surface of component 106 during operation of additive manufacturing device 102. Imaging device 126 is coupled to coating device 124 and is configured to record and/or store visible wave length data images of each build layer 116 and resulting surface of three-dimensional component 106.

Also, in the exemplary embodiment, additive manufacturing device 102 includes consolidation device 128 for consolidating portions of powder bed 108. Consolidating includes, for example and without limitation, combining, integrating, fusing, binding, and/or unifying particulate build material 110. In some embodiments, consolidation device 128 includes, for example and without limitation, an electromagnetic radiation source for combining, integrating, fusing, binding, and/or unifying particulate build material 110. In the exemplary embodiment, consolidation device 128 includes one or more galvanometer optical scanners 130 and/or one or more motorized mirrors, lenses, and/or other optical devices. Consolidation device 128 is configured to scan energy beam 114 over selective portions of powder bed 108. In alternative embodiments, additive manufacturing system 100 includes any consolidation device 128 that enables additive manufacturing system 100 to operate as described herein.

In the exemplary embodiment, consolidation device 128, energy source 112, imaging device 126, and coating device 124 are coupled in communication with a controller 132. Also, in the exemplary embodiment, controller 132 is coupled in communication with a computing device 134. In alternative embodiments, controller 132 is coupled in communication with any component that enables additive manufacturing system 100 to operate as described herein.

In operation, additive manufacturing system 100 fabricates three-dimensional component 106 by a layer-by-layer manufacturing process. More specifically, three-dimensional component 106 is fabricated from a model including an electronic representation of the three-dimensional geometry of three-dimensional component 106. For example, the electronic representation is produced as a computer aided design (CAD) file or similar electronic file. In alternative embodiments, the electronic representation is any electronic representation that enables additive manufacturing system 100 to operate as described herein.

In the exemplary embodiment, a build file (or files) is generated based on the electronic representation. In some embodiments, the build file includes at least one generating function, at least one function parameter, and at least one seed value. During operation, a curve representing the three-dimensional geometry is generated using the at least one generating function, the at least one function parameter, and the at least one seed value. The at least one seed value is provided separately from the at least one generating function and/or the at least one function parameter. For example, in some embodiments, the at least one generating function is stored on controller 132 and the at least one seed value is provided to controller 132. The at least one seed value is combined with the at least one generating function and, if necessary, at least one function parameter, on controller 132 to complete the build file and generate a curve for three-dimensional component 106. In further embodiments, at least one generating function and/or at least one function parameter is provided with the at least one seed value. In some embodiments, the curve includes at least one non-linear section. As a result, additive manufacturing system 100 is able to more precisely produce three-dimensional components 106 including complex shapes and curves than at least some known systems which utilize vectors or linear sections to approximate curved portions of three-dimensional component 106. In addition, additive manufacturing system 100 reduces manufacturing time because the build file(s) are less data intensive than the files used in at least some known systems.

In some embodiments, the build file includes a plurality of functions representing different portions of three-dimensional component 106. For example, in some embodiments, the build file has a layer-by-layer format that includes at least one function for each build layer 116. For the layer-by-layer format, the geometry of three-dimensional component 106 is sliced into a stack of two-dimensional build layers 116 of a desired thickness, such that the geometry of each build layer 116 is an outline of the cross-section through three-dimensional component 106 at that particular build layer 116 location. In the exemplary embodiment, the one or more functions allow controller 132 to store and process the build file for the entire three-dimensional component 106 at a single time. In addition, the build file enables controller 132 to compare different portions of three-dimensional component 106 during operation of additive manufacturing system 100. In alternative embodiments, additive manufacturing system 100 uses any build file that enables additive manufacturing system 100 to operate as described herein. For example, in some embodiments, the build file includes at least one function for generating at least one of the following, without limitation, a B-spline curve, a Hilbert curve, a lattice, and a unit cell.

In some embodiments, the build file includes an encryption key that allows encryption of the one or more functions of the build file. When the build file is loaded on controller 132 and/or computing device 134, controller 132 and/or computing device 134 reads the encryption key and the build file is decrypted. In alternative embodiments, additive manufacturing system 100 uses any encryption system that enables additive manufacturing system 100 to operate as described herein.

In the exemplary embodiment, additive manufacturing system 100 does not use a pre-existing article as the precursor to the final component, rather the process produces three-dimensional component 106 from a raw material in a configurable form, such as powdered particulate build material 110. For example, in some embodiments, a steel alloy material is additively manufactured using a steel alloy powder. In alternative embodiments, additive manufacturing system 100 produces three-dimensional component 106 from any material that enables additive manufacturing system 100 to operate as described herein.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

As used herein, the term "build parameter" refers to characteristics that are used to define the operating conditions of additive manufacturing system 100, such as a power output of energy source 112, a consolidating speed of energy source 112, a raster power output of energy source 112, a raster consolidating speed of energy source 112, a raster tool path of energy source 112, and a contour power output of energy source 112 within additive manufacturing system 100. In some embodiments, the build parameters are initially input by a user into computing device 134. The build parameters represent a given operating state of additive manufacturing system 100.

As used herein, the term "function parameter" refers to input values for constants of a function. In some embodiments, a set of function parameters is sent to controller 132 separately from the generating function. In further embodiments, sets of function parameters are stored on controller 132 and at least one set of the function parameters is selected for one or more curves. Accordingly, the function parameters allow a function to represent a plurality of different curves and reduce the data required to generate the curves.

As used herein, the term "seed value" refers to input values for variables of a function. In the exemplary embodiment, a set of seed values are provided separately from the generating function and the function parameters. The seed values are determined based on a specific curve of a component. Because the build file includes the function and function parameters, the set of seed value(s) required to generate a curve is reduced in comparison to a list of coordinate points or vectors used in at least some known systems to approximate a curve. In alternative embodiments, the build file includes any values that enable additive manufacturing system 100 to operate as described herein.

During operation of additive manufacturing system 100, coating device 124 is positioned adjacent to build platform 104. Coating device 124 extends in the transverse dimension across powder bed 108 and translates in the longitudinal dimension during the re-coat process. As coating device 124 moves along in the longitudinal direction, coating device 124 deposits and distributes a layer of particulate build material 110 on build platform 104, forming build layer 116. After formation of build layer 116, energy source 112 channels energy beam 114 through consolidation device 128 to direct energy beam 114 over selective portions of build layer 116 along a scan path. For example, galvanometer 130 of consolidation device 128 directs energy beam 114 over selective portions of build layer 116, forming a new portion of three-dimensional component 106. This process is then repeated for a plurality of build layers 116 to form three-dimensional component 106. In conjunction with coating device 124 moving along powder bed 108, imaging device 126 is used to record and/or store visible wave length data images of each build layer 116 and resulting surface of three-dimensional component 106. The generated images are then compared to the electronic computer build files to verify the manufacturing process.

In the exemplary embodiment, build platform 104, energy source 112, coating device 124, imaging device 126, and consolidation device 128 are operatively controlled by controller 132. Controller 132 is any controller that enables additive manufacturing system 100 to operate as described herein. In the exemplary embodiment, controller 132 is operatively coupled to computing device 134. In some embodiments, controller 132 is a computer system that includes at least one processor and at least one memory device.

Also, in the exemplary embodiment, computing device 134 includes at least one memory device 144 and at least one processor 146 coupled to memory device 144. In some embodiments, processor 146 includes one or more processing units, such as, without limitation, a multi-core configuration. In the exemplary embodiment, processor 146 includes a field programmable gate array (FPGA). In some embodiments, executable instructions are stored in memory device 144. For example, in some embodiments, processor 146 is programmed by encoding an operation as one or more executable instructions and providing the executable instructions in memory device 144. In the exemplary embodiment, memory device 144 includes one or more devices that enable storage and retrieval of information such as executable instructions or other data. In some embodiments, memory device 144 includes one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. In alternative embodiments, additive manufacturing system 100 includes any computing device 134 that enables additive manufacturing system 100 to operate as described herein.

In addition, in some embodiments, memory device 144 is configured to store data such as the build files used to direct consolidation device 128 and the images generated by imaging device 126. In alternative embodiments, memory device 144 stores any data that enable additive manufacturing system 100 to operate as described herein. In some embodiments, processor 146 removes or "purges" data from memory device 144 based on the age of the data. For example, processor 146 overwrites previously recorded and stored data associated with a subsequent time or event. In further embodiments, processor 146 removes data that exceeds a predetermined time interval. In addition, memory device 144 includes, without limitation, sufficient data, algorithms, and commands to facilitate monitoring and measuring of build parameters and the geometric conditions of three-dimensional component 106 fabricated by additive manufacturing system 100.

Moreover, in the exemplary embodiment, computing device 134 includes a presentation interface 148 coupled to processor 146. Presentation interface 148 presents information, such as images generated by imaging device 126, to a user. In one embodiment, presentation interface 148 includes a display adapter (not shown) coupled to a display device (not shown), such as a cathode ray tube (CRT), a liquid crystal display (LCD), an organic LED (OLED) display, or an "electronic ink" display. In some embodiments, presentation interface 148 includes one or more display devices. In some embodiments, presentation interface 148 includes an audio output device (not shown), for example, without limitation, an audio adapter or a speaker (not shown).

Also, in the exemplary embodiment, computing device 134 includes a user input interface 150. In the exemplary embodiment, user input interface 150 is coupled to processor 146 and receives input from the user. In some embodiments, user input interface 150 includes, for example, without limitation, a keyboard, a pointing device, a mouse, a stylus, a touch sensitive panel, such as, without limitation, a touch pad or a touch screen, and/or an audio input interface, such as, without limitation, a microphone. In further embodiments, a single component, such as a touch screen, functions as both a display device of presentation interface 148 and user input interface 150.

In addition, in the exemplary embodiment, a communication interface 152 is coupled to processor 146 and is configured to couple in communication with one or more other devices, such as controller 132, and to perform input and output operations with respect to such devices while performing as an input channel. For example, in some embodiments, communication interface 152 includes, without limitation, a wired network adapter, a wireless network adapter, a mobile telecommunications adapter, a serial communication adapter, or a parallel communication adapter. Communication interface 152 receives a data signal from and/or transmits a data signal to one or more remote devices.

Presentation interface 148 and communication interface 152 are both capable of providing information suitable for use with the methods described herein, such as, providing information to the user or processor 146. Accordingly, presentation interface 148 and communication interface 152 are referred to as output devices. Similarly, user input interface 150 and communication interface 152 are capable of receiving information suitable for use with the methods described herein and are referred to as input devices.

Figure 2:
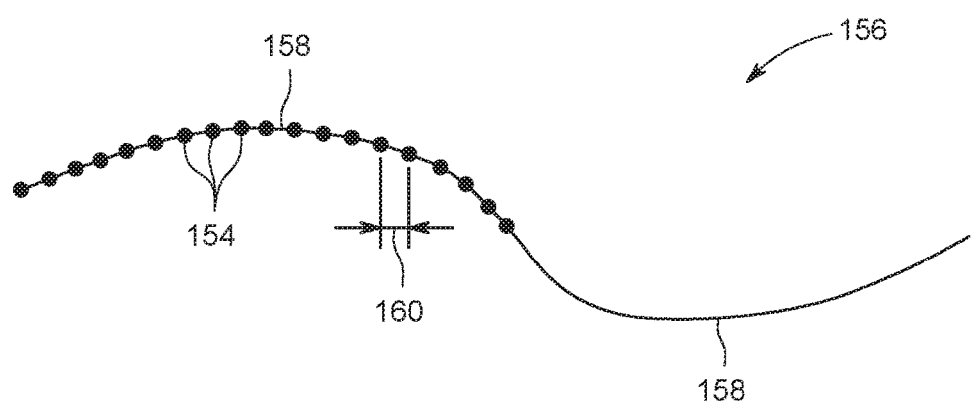
FIG. 2 is a schematic illustration of set points for a consolidation device of the additive manufacturing system shown in FIG. 1.

FIG. 2 is a schematic illustration of set points 154 for consolidation device 128 of additive manufacturing system 100 (shown in FIG. 1). Set points 154 are located along a curve 156 generated using a function, at least one function parameter, and at least one seed value. Curve 156 includes non-linear sections 158. In the exemplary embodiment, non-linear sections 158 are rounded and have concave and convex shapes. In alternative embodiments, curve 156 has any shape that enables additive manufacturing system 100 (shown in FIG. 1) to operate as described herein.

In some embodiments, curve 156 corresponds to an electronic model. In particular, in some embodiments, controller 132 directly translates the electronic model into curve 156. As a result, curve 156 enables consolidation device 128 (shown in FIG. 1) to precisely form three-dimensional components 106 (shown in FIG. 1). In addition, curve 156 reduces delays such as delays due to changes in directions at nodes between linear sections approximating a curve. In alternative embodiments, set points 154 are located along any curve that enables additive manufacturing system 100 (shown in FIG. 1) to operate as described herein.

In the exemplary embodiment, set points 154 are spaced apart a distance 160 such that set points 154 form a series of steps for consolidation device 128. In some embodiments, distance 160 is determined by the resolution of consolidation device 128 (shown in FIG. 1). Controller 132 enables production of three-dimensional component 106 (shown in FIG. 1) at the maximum resolution of consolidation device 128 (shown in FIG. 1) because set points 154 are located directly along curve 156 instead of along linear sections approximating a curve. The maximum resolution is determined by a distance limit or a time limit on controller 132. Accordingly, in some embodiments, a time between set points 154 is determined by the resolution of consolidation device 128 (shown in FIG. 1). In alternative embodiments, consolidation device 128 has any resolution that enables additive manufacturing system 100 (shown in FIG. 1) to operate as described herein.

Figure 3:
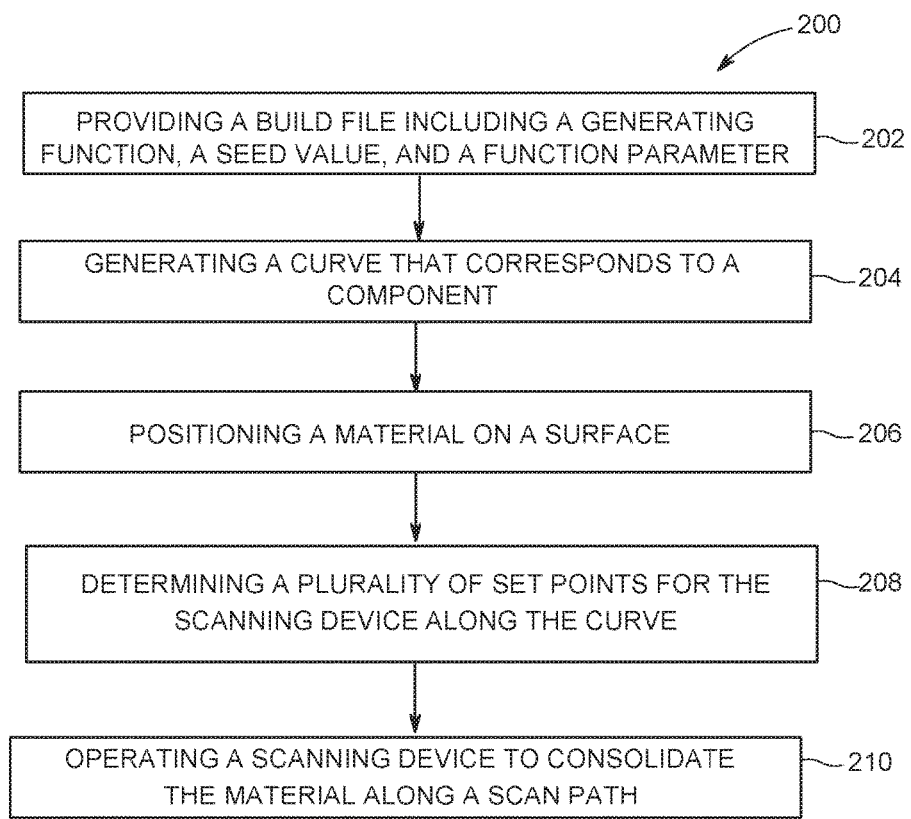
FIG. 3 is a flow chart of an exemplary method of producing a component using the additive manufacturing system shown in FIG. 1.

FIG. 3 is a flow chart of an exemplary method 200 of fabricating component 106 (shown in FIG. 1) using additive manufacturing system 100 (shown in FIG. 1). In reference to FIGS. 1 and 2, method 200 generally includes providing 202 a build file including a function, a seed value, and a function parameter. The function is provided 202 in any manner that enables additive manufacturing system 100 to operate as described herein. For example, in some embodiments, providing 202 includes selecting one or more functions that correspond to portions of the model from functions stored in a database. In some embodiments, the database includes functions that relate to curves applicable to a plurality of three-dimensional components 106. Accordingly, in some embodiments, the generating functions are used for a plurality of components 106 and the function parameters and/or the seed values are provided for each component 106. In further embodiments, at least one function is customized for a specific three-dimensional component 106. In alternative embodiments, additive manufacturing system 100 uses any function that enables additive manufacturing system 100 to operate as described herein.

In some embodiments, the function is embodied in a program code. The program code includes computer readable instructions that allow the controller to direct the consolidation device. In some embodiments, the program code is written to correlate to a specific component. In further embodiments, the program code is used for a plurality of components.

Also, in some embodiments, the build file and the functions are sent to controller 132 using signals. In further embodiments, at least a portion of the build file is generated and/or stored on controller 132. In alternative embodiments, the build file is provided in any manner that enables additive manufacturing system 100 to operate as described herein.

In addition, in the exemplary embodiment, method 200 includes generating 204 a curve corresponding to a model of three-dimensional component 106. The curve is defined using at least one function, at least one seed value, and at least one function parameter.

Moreover, in the exemplary embodiment, method 200 includes depositing or positioning 206 material 110 onto a surface. In some embodiments, material 110 is deposited onto successive build layers 116 in a layer-by-layer build process and superposed build layers 116 form three-dimensional component 106. In alternative embodiments, material 110 is deposited in any manner that enables additive manufacturing system 100 to operate as described herein.

Also, in some embodiments, method 200 includes determining 208 set points 154 (shown in FIG. 2) of consolidation device 128 along the curve defined by the function. In the exemplary embodiment, each set point 154 of consolidation device 128 is directly on the curve. As a result, additive manufacturing system 100 is able to utilize the full resolution of consolidation device 128 because consolidation device 128 is directed along the curve corresponding directly to the model of three-dimensional component 106. In addition, method 200 reduces errors in producing three-dimensional component 106 because additive manufacturing system 100 does not require linear segments to approximate a curve. In some embodiments, the actual position of consolidation device 128 is compared to the set points 154.

In addition, in the exemplary embodiment, method 200 includes operating 210 consolidation device 128 to consolidate material 110 along the scan path. In particular, controller 132 directs consolidation device 128 along the curve defined by the function of the build file. As controller is directed along the curve, consolidation device 128 consolidates material 110 along the scan path to form build layer 116. In alternative embodiments, additive manufacturing system 100 consolidates material 110 in any manner that enables additive manufacturing system 100 to operate as described herein.

Figure 4:
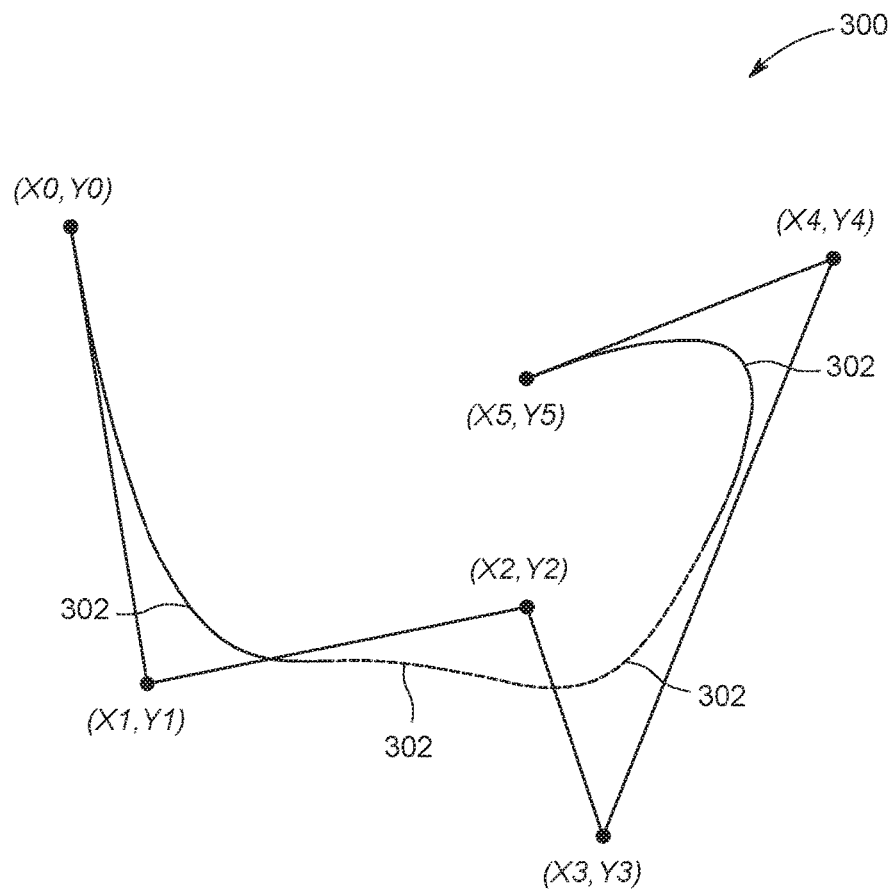
FIG. 4 is an illustration of an example curve generated using a function, a set of function parameters, and a set of seed values.

FIG. 4 is an illustration of an example curve 300 generating using a function, a set of function parameters, and a set of seed values. In the exemplary embodiment, curve 300 is a B-spline curve and includes non-linear portions 302. In alternative embodiments, additive manufacturing system 100 (shown in FIG. 1) generates any curve 300 that enables additive manufacturing system 100 to operate as described herein.

In some embodiments, the function is included, for example, in the following program code:

```
// Marking a B-Spline Curve
jump_abs(x0,y0);
bspline_abs(5, x1,y1, x2,y2, x3,y3, x4,y4, x5,y5);
where x and y are variables.
```

In the exemplary embodiment, curve 300 is generated by inputting a value for at least one of the x-variable and the y-variable. Accordingly, curve 300 requires less data to generate than a similar curve that is defined by a list of coordinates and/or vectors. As a result, the build files including such functions enable generation of complex curves from electronic files having a smaller size than electronic files including a comprehensive list of coordinate data.

Figure 5:
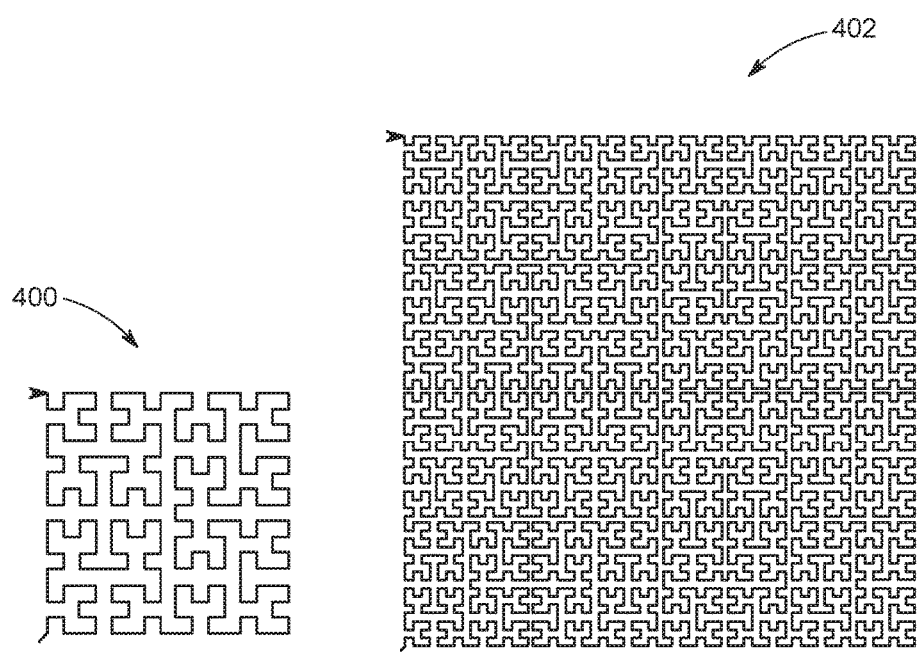
FIG. 5 is an illustration of example curves generated using a function and different inputs.

FIG. 5 is an illustration of example curves 400, 402 generating using a function and different inputs. In the exemplary embodiment, curves 400 and 402 are Hilbert curves. In alternative embodiments, the function defines any curves 400, 402 that enable additive manufacturing system 100 (shown in FIG. 1) to operate as described herein.

In some embodiments, the function is included, for example, in the following program code:

```
def: Hilbert(x0, y0, xi, yi, yj, Z, n, pixScaleX=400, pixScaleY=400):
    if n <= 0:
        X = (x0 + (xi + yi)/2)*pixScaleX - pixScaleX/2
        Y = (y0 + (xj + yj)/2)*pixScaleY - pixScaleY/2
        Turtle.setpos(round(x), round(Y))
    Else:
        Hilbert (x0, y0, yi/2, yj/2, xi/2, xj/2, Z, n - 1, pixScaleX, pixScaleY)
        Hilbert (x0 + xi/2, y0 + xj/2, xi/2, xj/2, yi/2, yj/2, Z, n - 1, pixScaleX, pixScaleY)
        Hilbert (x0 + xi/2 + yi/2, y0 + xj/2 + yj/2, xi/2, xj/2, yi/2, yj/2, Z, n - 1, pixScaleX, pixScaleY)
        Hilbert (x0 + xi/2 + yi, y0 + xj/2 + yj, -yi/2, -yj/2, -xi/2, -xj/2, Z, n - 1, pixScaleX, pixScaleY)
``` where x0, y0, xi, yi, yj, Z, and n are variables. In the exemplary embodiment, the program code is a recursive function. The function allows the generation of different curves by inputting different variables. For example, the dimensions and spacing of curves 400, 402 are changed by changing the input variables.

During operation, a call is entered to cause the program code to run and generate curves 400, 402. An example call to the program code includes:

```
Hilbert(startX, startY, 1.0, 0.0, 0.0, 1.0, 0.01, nDimensions,
    sizeMode1X, sizeMode1Y)
    where startX, startY, 1.0, 0.0, 0.0, 1.0, 0.01, nDimensions,
sizeMode1X, and sizeMode1Y are input variables.
```

In the exemplary embodiment, curves 400 and 402 are generated by inputting different values for the nDimensions variable into the function. In some embodiments, any of the variables are changed to generate curves different from curves 400 and 402. Accordingly, the function(s) allow for simpler changes to the build files because the curve is customized by changing one or more values of the function instead of changing a series of coordinate data. In alternative embodiments, any values are provided for variables that enable additive manufacturing system 100 (shown in FIG. 1) to operate as described herein. For example, in some embodiments, the function and function parameters provide a unit cell. In further embodiments, at least one variable of the function is changed to provide a curve including a desired number of unit cells. As used herein, the term "unit cell" refers to a repeating unit in a repetitive pattern.

The above-described embodiments provide systems and methods for fabricating a component using an additive manufacturing process. The component is fabricated using a build file including a function. A curve is generated using the function, at least one function parameter, and at least one seed value. In some embodiments, the curve includes at least one non-linear portion. Accordingly, the build file reduces the time to transfer and process data in comparison to at least some known systems. In addition, the build file allows the additive manufacturing system to fabricate components with increased precision and less errors because the controller directs a consolidation device along a curve generated using the function, at least one function parameter, and at least one seed value.

An exemplary technical effect of the systems and methods described herein includes at least one of: (a) reducing processing and/or transferring times of electronic files used in producing three-dimensional components; (b) decreasing cost to assemble three-dimensional components using an additive manufacturing system; (c) increasing the precision with which three-dimensional components are produced; and (d) increasing the compatibility of additive manufacturing systems with modeling software.

Exemplary embodiments of systems and methods for additive manufacturing are described above in detail. The methods and systems are not limited to the specific embodiments described herein, but rather, components of systems and/or steps of the methods may be utilized independently and separately from other components and/or steps described herein. For example, the method may also be used in combination with other systems, and are not limited to practice only with the additive manufacturing systems as described herein. Rather, the exemplary embodiments can be implemented and utilized in connection with many other applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing a component using an additive manufacturing system, said method comprising:
providing a build file on a controller of the additive manufacturing system, wherein the build file includes at least one generating function, at least one seed value, and at least one function parameter;
generating a curve that corresponds to the component based on the at least one generating function, the at least one seed value, and the at least one function parameter;
positioning a material on a surface;
determining, using the controller, a plurality of set points for a consolidation device of the additive manufacturing system, wherein the plurality of set points are located along the curve to form a series of equally spaced steps for the consolidation device, and wherein the plurality of set points are spaced apart a distance determined based on a resolution of the consolidation device; and
operating the consolidation device to consolidate the material.

2. The method in accordance with claim 1, wherein the plurality of set points determined by the controller are located along a non-linear portion of the curve.

3. The method in accordance with claim 1, wherein the providing of the build file on the controller of the additive manufacturing system comprises providing a program code including the at least one generating function, wherein at least a portion of the program code is customized for the component.

4. The method in accordance with claim 1 further comprising selecting the at least one generating function from a database.

5. The method in accordance with claim 1, wherein the at least one generating function defines at least one of a B-spline curve, a Hilbert curve, a lattice, and a unit cell.

6. The method in accordance with claim 1 further comprising determining an actual position of the consolidation device and comparing the actual position to the plurality of set points.

7. The method in accordance with claim 1 further comprising transmitting the build file for the component to the controller.

8. The method in accordance with claim 1, wherein the at least one generating function includes a first generating function relating to a first portion of the component and a second generating function relating to a second portion of the component.

9. The method in accordance with claim 8, wherein the first generating function is used to form a first layer of the component and the second generating function is used to form a second layer of the component.

10. The method in accordance with claim 1 further comprising providing at least one user input for the at least one generating function, wherein the generating function is executable to define the curve based on the at least one user input.

11. The method in accordance with claim 1, wherein the at least one generating function is encrypted, said method further comprising reading a key of the build file to decrypt the generating function.

12. An additive manufacturing system for manufacturing a component using a build file, the additive manufacturing system comprising:
a controller configured to receive the build file, wherein the build file includes at least one generating function, at least one seed value, and at least one function parameter;
a positioning device configured to position a material on a surface; and
a consolidation device coupled to said controller and positionable relative to the surface, wherein said consolidation device is configured to consolidate the material, wherein said controller is configured to determine a plurality of set points for said consolidation device along a curve defined by the at least one generating function, the at least one seed value, and the at least one function parameter, wherein the plurality of set points are located along the curve to form a series of equally spaced steps for said consolidation device, and wherein the plurality of set points are spaced apart a distance determined based on a resolution of said consolidation device.

13. The additive manufacturing system in accordance with claim 12, wherein the plurality of set points determined by said controller are located along a non-linear portion of the curve.

14. The additive manufacturing system in accordance with claim 12, wherein the build file includes a program code including the at least one generating function, wherein at least a portion of the program code is customized for the component.

15. The additive manufacturing system in accordance with claim 12 further comprising a database including a plurality of generating functions, wherein the at least one build file generating function is selected from the generating functions from the database.

16. The additive manufacturing system in accordance with claim 12, wherein the at least one generating function defines at least one of a B-spline curve, a Hilbert curve, a lattice, and a unit cell.

17. The additive manufacturing system in accordance with claim 12 further comprising an imaging device configured to provide images for determining an actual position of said consolidation device, wherein said controller is configured to compare the actual position to the plurality of set points.

18. The additive manufacturing system in accordance with claim 12, wherein the at least one generating function includes a first generating function relating to a first portion of a component and a second generating function relating to a second portion of the component.

19. The additive manufacturing system in accordance with claim 12 further comprising a user input interface, wherein the at least one generating function is executable to define the curve based on at least one user input.

20. The additive manufacturing system in accordance with claim 12, wherein the at least one generating function is encrypted, and said controller is configured to read a key of the build file to decrypt the at least one generating function.

* * * * *